US006775986B2

(12) United States Patent
Ganz et al.

(10) Patent No.: US 6,775,986 B2
(45) Date of Patent: Aug. 17, 2004

(54) GAS TURBINE AND METHOD FOR SUPPRESSING AZIMUTHAL FLUCTUATION MODES IN A GAS TURBINE

(75) Inventors: Christopher Ganz, Zürich (CH); Wolfgang Weisenstein, Remetschwil (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/122,345

(22) Filed: Apr. 16, 2002

(65) Prior Publication Data

US 2002/0178730 A1 Dec. 5, 2002

(30) Foreign Application Priority Data

Apr. 17, 2001 (EP) ............................................ 01810376

(51) Int. Cl.$^7$ ............................... F02C 7/00; G01J 5/00
(52) U.S. Cl. ........................ 60/773; 60/776; 60/39.281
(58) Field of Search .......................... 60/776, 772, 773, 60/39.281

(56) References Cited

U.S. PATENT DOCUMENTS

| | | | | |
|---|---|---|---|---|
| 3,651,639 A | * | 3/1972 | Black ....................... | 60/39.281 |
| 3,893,291 A | * | 7/1975 | Davis et al. .............. | 60/39.281 |
| 4,060,980 A | * | 12/1977 | Elsaesser et al. ............. | 60/773 |
| 4,219,738 A | * | 8/1980 | Griesinger ............... | 60/39.281 |
| 5,148,667 A | * | 9/1992 | Morey ........................ | 60/779 |
| 5,257,496 A | * | 11/1993 | Brown et al. .................. | 60/773 |
| 5,544,478 A | | 8/1996 | Shu et al. | |
| 5,971,747 A | | 10/1999 | Lemelson et al. | |
| 6,135,760 A | * | 10/2000 | Cusack et al. ................ | 60/773 |
| 6,341,890 B1 | * | 1/2002 | Vally et al. .................... | 374/45 |
| 6,393,375 B1 | * | 5/2002 | Sivathanu ................... | 702/135 |
| 6,422,745 B1 | * | 7/2002 | Glasheen et al. ........... | 374/131 |

FOREIGN PATENT DOCUMENTS

| | | |
|---|---|---|
| DE | 19921981 A1 | 11/2000 |
| EP | 1065346 A1 | 1/2001 |
| GB | 749598 | 5/1956 |

OTHER PUBLICATIONS

Paschereit, et al., "Control of Thermoacoustic Instabilites and Emissions in an Industrial–Type Gas–Turbine Combustor", 27$^{th}$ Symposium (International) on Combustion/The Combustion Institute, 1998, pp. 1817–1824.

Paschereit, et al., "Flow–Acoustic Interactions as a Driving Mechanism for Thermocoustic Instabilities", 4$^{th}$ AIAA/CEAS Aeroacoustics Conference, Jun. 2–4, 1998, Toulouse, France, pp. 1–13.

Paschereit, et al., Coherent structures in swirling flows and their role in acoustic combustion control, Physics Of Fluids, vol. 11, No. 9, Sep. 1999, pp. 2667–2678.

* cited by examiner

*Primary Examiner*—Ted Kim
(74) *Attorney, Agent, or Firm*—Burns, Doane, Swecker & Mathis, L.L.P.

(57) ABSTRACT

In a gas turbine having a combustion chamber (6) and a first row of guide vanes (3) arranged on the outflow side of the combustion chamber (6), a plurality of temperature sensors (8) for measuring temperature value, and a plurality of means (7;71,72,73,74,75,76) for introducing fuel into the combustion chamber (6), which means can be controlled on the basis of the temperature values, the temperature sensors (8) are spectrometers, are designed to measure a combustion-gas temperature and are arranged so as to measure a gas temperature which prevails immediately in front of the first row of guide vanes (3).

7 Claims, 2 Drawing Sheets

GAS TURBINE AND METHOD FOR SUPPRESSING AZIMUTHAL FLUCTUATION MODES IN A GAS TURBINE

FIELD OF THE INVENTION

The invention relates to the field of thermal turbomachines, in particular to a gas turbine, and to a method for controlling combustion in a gas turbine, in accordance with the preambles of patent claims 1 and 5.

BACKGROUND OF THE INVENTION

A gas turbine of this type is known, for example, from EP 1 065 346 A1. In this turbine, temperature sensors are arranged in guide vanes belonging to a first row of guide vanes of a gas turbine. In each case one burner which is assigned to the temperature sensor is controlled on the basis of measured temperature values from in each case one temperature sensor. A temperature sensor is assigned, in an annular combustion chamber, one or more burners which lie opposite the sensor in a circumferential segment of the gas turbine and therefore influence its temperature most directly. The control evens out a temperature distribution over a circumference of the combustion chamber outlet, so that a rotor blade of the turbine is exposed to a temperature which is as uniform as possible during a revolution.

The temperature distribution of the combustion gases should be made uniform both in the radial direction and along the circumference, i.e. in the azimuthal direction, in order to minimize thermal loads on a first row of turbine guide vanes. Hot gas which originates from a flame is at a different temperature from gas which originates from areas between the flames or is added as cooling air. In conventional combustion-chamber designs, the maximum possible turbulence is imposed, resulting in mixing of the gas flows and to some extent the temperatures being made more uniform. However, this has the drawback that energy is required to produce this turbulence, which leads to a greater pressure drop in the combustion chamber and therefore to worse overall efficiency of the machine. Moreover, the higher degree of turbulence lengthens the residence time of the gas molecules in the hot area of the combustion chamber, with the result that the thermal formation of nitrogen oxides in accordance with the Zeldovic mechanism is increased.

An additional problem with modern gas turbine combustion chambers is the occurrence of combustion fluctuations which, as a result of fluctuating liberation of heat, generate pressure pulses, which in turn impose a high mechanical load on the materials of the combustion chamber and turbine. In recent developments, this load has been combated by active control of the combustion stability, as described, for example, in K. C. Schadow, E. Gutmark and K. J. Wilson "Active combustion control in a coaxial dump combustor" Combust. Sci. Technol. 81, 285 (1992) and in C. O. Paschereit, E. Gutmark and W. Weisenstein "Control of thermoacoustic instabilities and emissions in an industrial type gas turbine combustor" 27th International Symposium on Combustion, The Combustion Institute, Aug. 2–7 1998. However, one of the significant problems with practical use of the developments described in those articles is the determination of the nature of combustion fluctuations which occur and their causes by sensor means. Even if the causes are by now very well known from tests and are documented, for example in C. O. Paschereit, E. Gutmark and W. Weisenstein"Coherent structures in swirling flows and their role in acoustic combustion control" Physics of Fluids 11, No. 9, September 1999, linking actual measurements with suitable countermeasures in some cases causes considerable difficulties, on account of the current deficiencies of sensor devices, when taking suitable countermeasures, particularly with azimuthal fluctuation modes.

SUMMARY OF THE INVENTION

Therefore, it is an object of the invention to provide a gas turbine and a method for controlling combustion in a gas turbine of the type described in the introduction which eliminates the above drawbacks.

This object is achieved by a gas turbine having the features of patent claim 1 and a method for controlling combustion in a gas turbine having the features of patent claim 5.

Therefore, as temperature sensors, the gas turbine according to the invention has spectrometers, which are designed to measure a combustion-gas temperature and are arranged so as to measure a gas temperature which prevails immediately in front of a first row of guide vanes.

The use of spectrometers allows precise, relatively high-frequency measurement of hot-gas temperatures. Moreover, drawbacks of thermocouples which are fitted in turbine blades, such as for example discrepancies or losses in quality of heat transfers between blades and thermocouples, are avoided.

In the method according to the invention for controlling combustion in a gas turbine, means for introducing fuel into a combustion chamber are controlled on the basis of measured temperature values, the temperature values being measured using spectrometers which are designed to measure a combustion-gas temperature and measure combustion-gas temperatures which prevail immediately in front of the first row of guide vanes.

In this way, it is possible to avoid excessive increases in temperature at the first row of guide vanes by controlling the supply of fuel. Combating of excessively high temperatures by means of deliberately produced turbulence is only required to a lesser extent, which leads to improved efficiency and to reduced nitrogen oxide emissions.

In a preferred embodiment of the invention, the temperature sensors are designed to measure a gas temperature of steam. For this purpose, in front of a photographic element which converts the recorded radiation into an electrical signal, it has a bandpass filter, which only transmits the radiation in frequency ranges which are only or predominantly characteristic of steam. In this way, it becomes possible to measure the temperature of the combustion gas directly, without contact and without disturbing the flow by having to fit additional components, on the basis of a typical exhaust-gas component. Steam has the advantage of having a very broad emission spectrum, which ensures a strong measurement signal and therefore a high measurement accuracy, and also of always being present in relatively large amounts when hydrocarbons are being burnt in the combustion gas. Similar measurements can also be carried out using carbon dioxide. In principle, it is also possible to measure the emissions of oxygen and nitrogen. All other possible exhaust-gas components generally count as air pollutants, the emission of which is to be reduced further by the use of modern techniques.

In a preferred variant of the method according to the invention, temperature values from a temperature sensor are used to determine an associated azimuthal gas-temperature profile in front of the first row of guide vanes. A deviation from an ideal, predetermined gas-temperature profile is recorded, and an associated means for introducing fuel is controlled on the basis of this deviation, in order to eliminate temperature peaks, or alternatively the need for maintenance is indicated.

In a further preferred variant of the method according to the invention, means for introducing fuel are controlled on the basis of temperature values from one or more temperature sensors, in order to compensate for axially symmetrical and/or azimuthal fluctuations in combustion. This is made possible by the measurement frequency of the sensors which are used according to the invention which is high compared to that of conventional sensors.

Further preferred embodiments will emerge from the dependent patent claims.

BRIEF DESCRIPTION OF THE DRAWINGS

The subject matter of the invention is explained in more detail below on the basis of preferred exemplary embodiments which are illustrated in the appended drawings, in which.

The reference numerals which are used in the drawings, as well as their meaning, are compiled in the list of reference symbols. In principle, identical parts in the figures are provided with identical reference symbols.

DETAILED DESCRIPTION OF THE INVENTION

Figure 1:
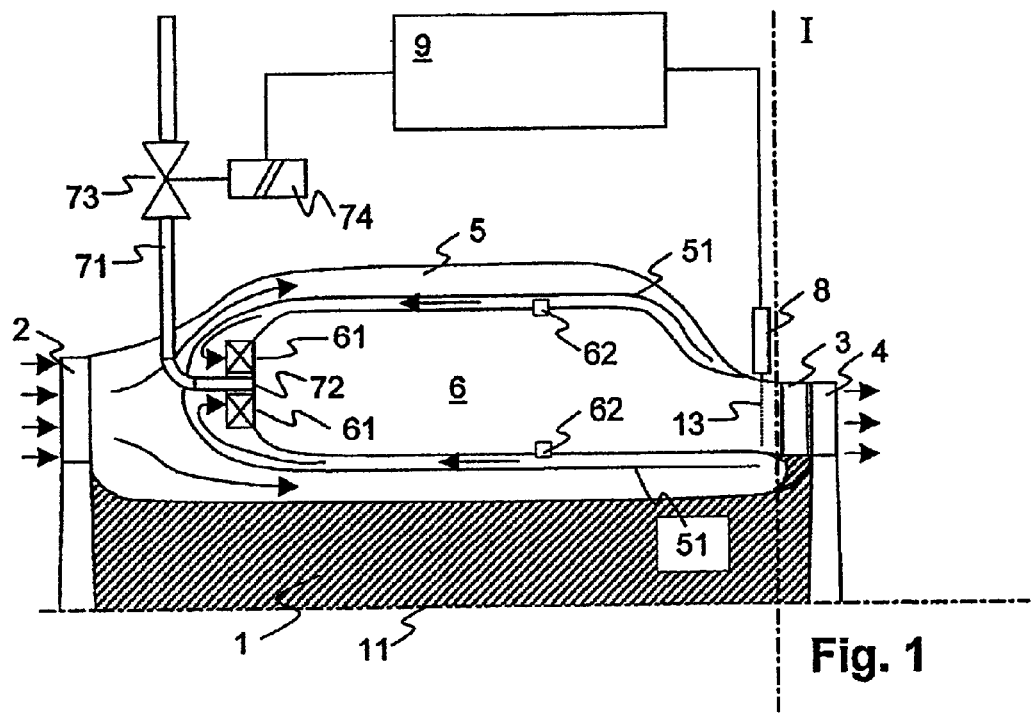
FIG. 1 diagrammatically depicts a longitudinal section through significant components of a gas turbine according to the invention.

FIG. 1 diagrammatically depicts a longitudinal section through components of a gas turbine according to the invention which are significant to the invention. Only one half of the longitudinal section is shown; the other half is mirror-symmetrical with respect to an axis of symmetry 11. A final row of compressor blades 2 of a compressor (not shown) and a first row of rotor blades 4 of a turbine (not shown) are connected to a rotor 1. A first row of guide vanes 3 is arranged in front of the first row of rotor blades 4. Between the row of compressor blades 2 and the first row of guide vanes 3 there is a combustion chamber 6, surrounded by a plenum 5. When the gas turbine is operating, an operating medium, normally air, the direction of flow of which is indicated by arrows, flows through said components. The combustion chamber 6 has combustion air feeds 61, cooling-air feeds 62 and air guide plates 51. The gas turbine has means 7 for introducing fuel, having a fuel feed line 71, a fuel injection device 72 and a valve 73, which can be actuated by a first actuating element 74. According to the invention, temperature sensors 8 are arranged at an outlet or outflow-side end of the combustion chamber 6, which sensors measure a temperature of the working medium flowing through, i.e. in this case of hot combustion gases, in a non-intrusive manner, i.e. without the working medium flowing around them, on the basis of temperature radiation which is radiated passively by gas molecules of the combustion gases.

The temperature sensors 8 are arranged so as to measure the gas temperature which prevails immediately in front of the first row of guide vanes 3. For this purpose, a direction of view 13 of each sensor faces at least approximately radially into the gas path. In each case one temperature sensor 8 is operatively connected to a controller 9, and in each case one controller 9 is operatively connected to a first actuating element 74.

The means 7 for introducing fuel are also known as burners. This term is understood as meaning a system for supplying fuel, for introducing the fuel into an operating medium, for mixing the fuel with the operating medium and, if appropriate, for stabilizing a flame. To fulfill these functions, a burner has, instead of a fuel lance, for example a flame tube or an arrangement for swirl-stabilizing of the flame.

Figure 3:
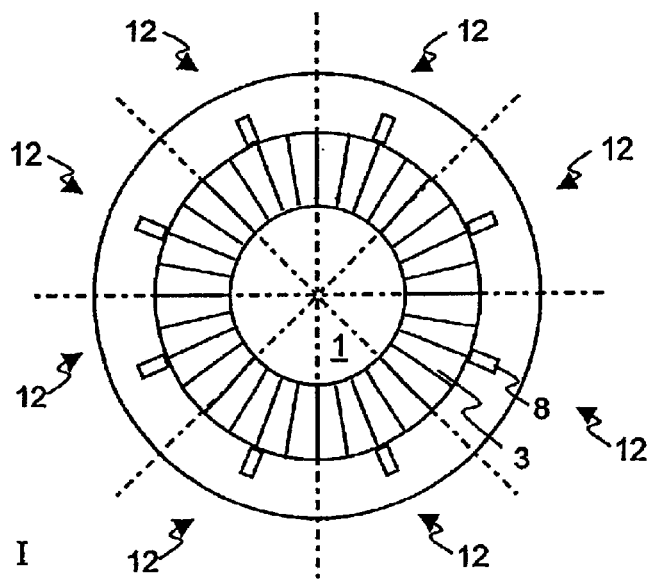
FIG. 3 diagrammatically depicts a cross section through the gas turbine.

FIG. 3 shows a cross section through the gas turbine from FIG. 1 in a section plane 1. If the gas turbine is viewed in the direction of the rotor axis, it can be imaginarily divided into a number of circumferential segments 12. In a preferred embodiment of the invention, each circumferential segment 12 has a temperature sensor 8, an associated controller 9 and associated means 7 for introducing fuel. In another embodiment of the invention, a circumferential segment 12 has a plurality of burners, which are controlled by means of a common valve 73 and are together assigned to the temperature sensor 8 of the circumferential segment 12. Therefore, a plurality of temperature sensors 8 are distributed uniformly over the circumference of the gas turbine.

When the gas turbine is operating, compressed air from the compressor flows into the plenum 5, is guided onto the combustion-chamber wall by the guide plates 51 and in this way convectively cools the combustion chamber 6. Then, the air is passed through the combustion-air feeds 61 into the combustion chamber 6, is mixed with fuel from the fuel lance 72 and is burned in a flame. If appropriate, some of the air is passed through cooling-air openings 62 into the interior of the combustion chamber 6, where it forms a film of cooling air on the surface of the combustion-chamber wall and thereby protects it from overheating. A highly turbulent flow inside the combustion chamber causes combustion gases from the flame and cooling air from the cooling-air feed 62 to be partially mixed after a certain time, typically after a few microseconds, after which, at an outflow-side end of the combustion chamber 6, they pass through the first row of guide vanes 3 and the first row of rotor blades 4 into the turbine. However, the conditions described here apply only to a gas turbine in a perfect state which is situated precisely at the design operating point. Even minor deviations from this design operating point may lead to the flow conditions in the combustion chamber changing in a disadvantageous way.

Figures 4, 5:
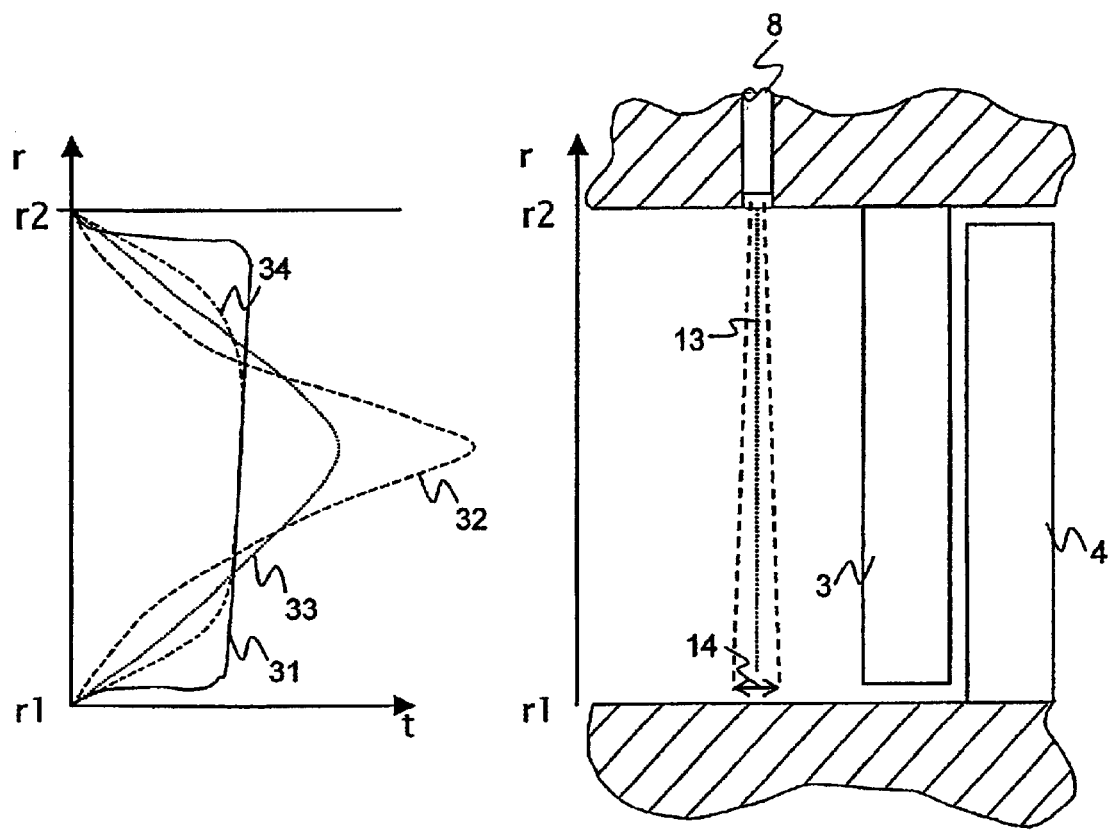
FIG. 4 shows various radial gas-temperature profiles.
FIG. 5 shows a detailed view of a combustion-chamber outlet from FIG. 1.

FIG. 4 shows four different radial gas-temperature profiles 31, 32, 33, 34 immediately in front of the first row of guide vanes 3. Gas temperature values in the direction of a gas temperature axis t are plotted along a radial direction r. A first radius r1 is the inner radius of the combustion-chamber outlet or of the turbine inlet. A second radius r2 is the outer radius of the combustion-chamber outlet or of the turbine inlet. In each case in a peripheral region of the gas flow, i.e. in the vicinity of the first and second radii r1, r2, i.e. close to the combustion-chamber wall, the gas temperatures are relatively low, for example in a range from approximately 730 K to approximately 900 K, on account of the cooling air which is admixed through the cooling-air feeds 62. The higher temperature of the combustion gases prevails in the center, between the first and second radii r1, r2, at temperatures of, for example, approx. 1100 K to approx. 1400 K, depending on the design of the gas turbine.

If the gas turbine is in an optimum state, there is a predominantly flat temperature distribution in both the radial direction and the azimuthal direction, in accordance with a first gas-temperature profile 31: the temperatures are therefore substantially the same, with the exception of the cooled peripheral regions of the gas flow. The slightly lower temperature at the inner periphery of the flow passage is desirable, since this is where the mechanical load on the rotor blades 4 is highest, and consequently the temperature load should be reduced. A less than optimum profile of the temperature distribution corresponds to the remaining, namely second, third and fourth, gas-temperature profiles 32, 33, 34, i.e. has either a local excessively high temperature with lower temperatures at other locations or lower temperatures in the outer area with a peak temperature of the desired height. In these cases, the local temperature distribution differs from the distribution at other locations on the circumference of the combustion-chamber outlet, which for all the rotating elements of the turbine leads to a periodically fluctuating temperature load. Since the materials of the turbine blades and vanes are in any case loaded up to the acceptable limits, this leads to a significant reduction in the expected service life. The first, second and third gas-temperature profiles 31, 32 and 33 substantially correspond to the same level of output power. A level of a heat flux, i.e. the integral of the temperature distribution, is likewise substantially identical for the first, second and third gas-temperature profiles 31, 32 and 33. However, the three gas-temperature profiles 31, 32 and 33 have different radial temperature distributions and different peak temperatures. By contrast, the temperature profile 34 corresponds to a situation in which, although the peak temperature is of the desired level, the heat flux through the measured section is below the optimum heat flux. The second and third less than optimum gas-temperature profiles 32 and 33 may moreover lead to local overheating and therefore to direct damage to the vanes of the first row of guide vanes 3 and, if appropriate, to further rows of blades and vanes. To avoid damage or excessive aging of the gas turbine, it is advantageous for such less than optimum second, third and fourth gas-temperature profiles 32, 33, 34 to be detected, so that countermeasures can be taken. There are various causes for temperature profiles being less than optimum. Poor or even incorrect mixing of fuel and air or flame gas and air is present for the second and third gas-temperature profiles 32 and 33, both before, during and after the combustion. The cause of the fourth gas-temperature profile 34 lies in an uneven distribution of fuel between the individual burners, with the result that the burner under consideration here receives insufficient fuel. A situation in which the burner under consideration is fed with too much fuel but establishes a correct temperature profile, except with a peak temperature which is too high, is also conceivable. This case is not illustrated in FIG. 3 but can in principle also be detected with the aid of the invention.

A first countermeasure against excessively high peak temperatures is to reduce the power of the gas turbine. By way of example, a quantity of fuel in the associated burner is controlled, by means of the associated controller 9 and the associated first actuating element 74, on the basis of measured temperature values from a temperature sensor 8. Since a lower throughput of fuel also reduces the peak temperatures of the respective flames, the load on the turbine material also falls. However, a reduced turbine inlet temperature, given a temperature profile which is less than optimum, above all also reduces the overall efficiency of the machine for a prolonged period. It is more advantageous to measure the combustion-gas temperature immediately before it enters the first row of turbine guide vanes, as is possible by applying the invention, and to reduce the supply of fuel to the burner with an excessively high temperature profile on the basis of this measurement and, at the same time, to increase the flow of fuel to the other burners proportionately, in such a way that a) the same temperature level is reached at the outlet from all the burners, and b) the joint temperature level of all the burners does not exceed the load limits which are predetermined by the turbine material and the cooling technique employed. For this purpose, the controllers 9 of the combustion chambers in question are connected up with a higher-order controller, which predetermines the overall power and the individual flows of fuel.

A second countermeasure is maintenance work in order to optimize the flow in the combustion chamber 6, for example by machining the cooling-air feeds 62. However, for most of the cases which are technically relevant, to do this it is necessary to increase the supply of cooling air, since the local flame temperature is too high. In this case, less air is available for the actual combustion, with the result that, for the same throughput of fuel, the flame temperature increases. The increased flame temperature then leads to an undesired rise in the emissions of nitrogen oxides in the core area of the flame and to increased emissions of carbon monoxide in the vicinity of the combustion-chamber wall, since the increased supply of cooling air at the wall leads to more intensive quenching of the combustion reaction. However, applying the invention has made it possible, for the first time, to detect the nature of a temperature profile which is less than optimum and to determine the required countermeasures from this information.

The nature of the gas-temperature profiles, or characteristic values for characterizing the gas-temperature profiles, is/are determined in the following way: FIG. 5 shows a detailed view of the combustion-chamber outlet from FIG. 1. A temperature-resistant lens system receives the thermal radiation emitted from the combustion exhaust gas and transmits it, via an optical waveguide, to a receiver module of the temperature sensor 8. The incident radiation is passed through a bandpass filter, which is set to the frequency spectrum of the desired gas component, i.e. steam or carbon dioxide. The filtered radiation impinges on a photographic element which converts the radiation intensity into an electrical signal. In this way, the measurement system records a gas temperature which, as seen in the direction of flow, prevails immediately in front of the first row of guide vanes 3, preferably at a distance of at least approximately 0.5 to 1 cm and at most approximately 5 to 10 cm in front of the first row of guide vanes 3. In a preferred embodiment of the invention, the temperature sensor 8 does not project into the gas flow, so that the gas flow is not influenced.

In a preferred embodiment of the invention, the temperature sensor 8 is a fiber-optic sensor, i.e. an optical waveguide leads from a sensor body to the measurement location. The optical waveguide passes through the combustion-chamber wall, a lens being arranged at an end of the optical waveguide in the combustion-chamber wall, without projecting into the gas path.

The measurement axis 13 of the temperature sensor 8 runs substantially in the radial direction. The sensor has a lens aperture or an aperture angle 14 which is, for example, 1 degree. The larger the aperture angle 14, the higher the radiation energy absorbed and therefore the quality of the measurement signal. On the other hand, an excessively wide aperture angle leads to inaccuracies in the local assignment of the measurement signal. The optimum parameters have to be selected in accordance with the geometric dimensions of the combustion chamber.

The temperature sensor 8 functions in accordance with the principle of a spectrometer. However, unlike commercially available spectrometers, it operates not only in the optical radiation range but also, depending on the particular application, in the infrared or ultraviolet range. A major advantage of a sensor of this type is that all the electronic components can be arranged outside the machine and therefore in readily accessible locations. The radiation signal is removed from the machine via optical waveguides which only transmit radiation but do not yet transmit an electrical signal.

The temperature sensor 8 is preferably designed to measure the temperature of a specific component of the combustion gas, in particular a component which occurs independently of the fuel used. Therefore, steam ($H_2O$) or carbon dioxide ($CO_2$) are particularly suitable as components whose temperature is measured. For this purpose, the sensor is equipped with a bandpass filter, which is set to characteristic frequency bands of the components to be measured. This means that the filter only transmits radiation in a frequency band which corresponds to the component to be measured, and that only the radiation transmitted by the bandpass filter is measured by the sensor. This prevents, for example, the temperature of the combustion-chamber wall, which is naturally cooler, from being measured. The choice of component measured is substantially dependent on the fuel selected. In the case of a fuel with a low C/H ratio, such as for example natural gas, it is preferable to select steam, since this forms the largest proportion of the combustion products in the exhaust gas. For a high C/H ratio, such as for example when using heavy oil, it is preferable to measure carbon dioxide, since the equilibrium in the exhaust gas has shifted in this direction on account of the higher proportion of carbon in the fuel. The influence of the concentration of the measured component is low, since modem gas turbines, on account of the use of premix combustion, have only a narrow control range with minor changes in the exhaust-gas concentration, and this slight influence can easily be compensated for in linear fashion by measuring the flow of fuel. Since the invention serves primarily to minimize temperature irregularities over the combustion-chamber circumference, slight changes in concentration and therefore in signal have no effect. In the context of the invention, it is not absolute temperatures, but rather temperature differences over the circumference of the combustion chamber, which are measured. However, the level of these differences is almost exclusively dependent on the relative fuel distribution and is only slightly dependent on the absolute throughput of fuel. However, the ambient pressure has a significant influence on the level of the measurement signal, the signal strength increasing at higher pressure. However, since the operating pressure of stationary gas turbines is to an initial approximation constant within the control range, this influence can initially be ignored. Should compensation for the influence of pressure be required, this is readily possible by processing a pressure signal which is already measured in any case, since the influence of pressure is linear.

A measured or sensor value from the temperature sensor 8 represents a sum of all the radiation which is captured by the temperature-resistant lens system of the sensor. A frequency of the captured radiation lies within the frequencies which the bandpass filter transmits, the precise value of the frequency corresponding to the maximum temperature of the radiating gas, on account of Planck's law. Therefore, a bandwidth of the bandpass filter is as narrow as possible, but wide enough to transmit radiation of the combustion-gas component under consideration over a temperature range which occurs when the gas turbine is operating.

Sensor values from a plurality of temperature sensors 8, a collection of whose recording ranges is known as the measurement grid, contain information both about a spatial and temporal distribution of peak temperatures and of the heat flux through the measurement grid. The heat flux corresponds to the integral of the temperature distribution with respect to the mass flow rate flowing through over the radial cross section. In a preferred variant of the invention, the measurement signal is analyzed by means of a fast Fourier transform. In this way, both the peak temperature and the temperature distribution can be determined very easily even in the event of fluctuations in combustion. With a fast Fourier transform (FT), a model function, comprising the sum of the periodic functions sine and cosine, is derived in a known manner from a number of discrete pairs of values (time, measured value), which have been measured over a specific, preselected time. The periodic functions are assigned discrete frequencies, which are at a constant distance delta-f from one another, and coefficients, which are a measure of the signal strength at the corresponding frequency. If the level of the respective coefficients is then plotted in a diagram as a function of the frequency within a frequency range, the frequency at which the highest signal strength is present can easily be read from the profile of the resultant curve. Therefore, an illustration of this type is also known as a power spectrum. In this way, a time-dependent signal is transformed into a frequency-dependent representation.

If there is an optimum gas temperature distribution in accordance with the first gas-temperature profile 31, the result is a specific sensor value, referred to below as the reference value. The following statements relate to the determination of the gas temperature distribution in the radial direction, on the assumption that fluctuations in combustion with frequencies in the acoustic range have no significant influence on the measured values.

If there is a less than optimum temperature distribution corresponding to the second or third gas-temperature profile 32, 33, the radial position of the peak temperature is of subordinate importance, since any temperature profile of this type indicates the need for major maintenance work.

It is possible to differentiate the various gas-temperature profiles 31, 32, 33, 34 in the following way: if, for an identical fuel mass flow rate, the peak temperature is slightly or considerably higher than the reference value, the temperature distribution corresponds to the third or second gas-temperature profile, respectively. If the fuel mass flow rate is lower, with the peak temperature being substantially equal to the reference value, the fourth gas-temperature profile is present. The following conclusions can be drawn from the nature of the gas-temperature profile:

If there is an uneven distribution in accordance with the second gas-temperature profile 32, there is a peak temperature which is far too high, even though the heat flux reaches precisely the desired value. In this case, there is a considerable error in the mixing of fuel and air prior to combustion or flame gas and air during and after combustion. The cause could be contamination at the burner, but more likely is mechanical or thermal damage to the combustion-chamber liner. In any event, immediate maintenance work is to be undertaken.

If there is an uneven distribution corresponding to the third gas-temperature profile 33, it is very likely that the cause lies in contamination of or damage to the fuel nozzles. The peak temperature is slightly too high, yet nevertheless the heat flux through the measurement grid is below the desired value. Therefore, more fuel has to be converted in the center of the flow in order to sufficiently stabilize combustion. In this case, temporary protection of the row of turbine guide vanes 3 can be achieved by reducing the flow of fuel. In the long term, maintenance work is required in this case too.

If there is an uneven distribution corresponding to the fourth gas-temperature profile 34, this burner is receiving too little fuel. Although the peak temperature is at the desired value, the heat flux is too low, which is reflected in the weak gradient of the gas temperature in the peripheral regions. This case is typical of an uneven distribution of fuel between the burners of the gas turbine. However, when using the invention, the flow of fuel to the individual burner can be increased, while the flow of fuel to the remaining burners can be reduced until there is a uniform distribution of energy in the machine. In this case, the total energy conversion of the machine is once again determined by the higher-level controller, which determines the desired values for the individual burners.

A measured sensor value serves as a characteristic value for characterizing a gas-temperature profile. The nature of the temperature profile which is present is worked out on the basis of a measured sensor value. The means 7 for introducing fuel are actuated by the controller 9 according to a deviation of the measured sensor value from the reference value. This control is preferably to be effected by a fast PID controller, which can follow even dynamic changes, for example those caused by a load change. In principle, it is also possible to use limit-value controllers, in which the actuating valve 73 is actuated by an electric motor actuating drive, but in this case it is necessary to accept a lower control accuracy. In this case, the desired value of the fuel flow is enclosed by two limit values which are as close together as possible. When the fuel flow falls below the lower limit value, the electric motor actuating drive is activated in such a way that the actuating valve 73 is opened further. When the flow exceeds the lower limit value again, the actuating drive is stopped. The same occurs when the upper limit value is exceeded, except that in this case the actuating valve is closed further. On account of the low control range of premix burners, of approx. 70 K, the limit values have to be set very close together. If the upper limit value is set to be too high, the adiabatic flame temperature rises to over 1750 K and large amounts of nitrogen oxides are formed. By contrast, if the lower limit value is set to be too low, the lean extinction limit may be undershot and fluctuations in combustion may occur.

The following statements relate to control of combustion working on the assumption that fluctuations in combustion occur with frequencies in the acoustic range: in a preferred embodiment of the invention, on the basis of temperature values from a temperature sensor 8 a means 7 for introducing fuel which is assigned to the temperature sensor 8 is controlled in order to compensate for, i.e. attenuate or eliminate, axially symmetrical combustion fluctuations. For this purpose, the fluctuations in the sensor signal in the range of acoustic frequencies, i.e. from approx. 0 to approx. 10 kHz, are continuously investigated.

Figure 2:
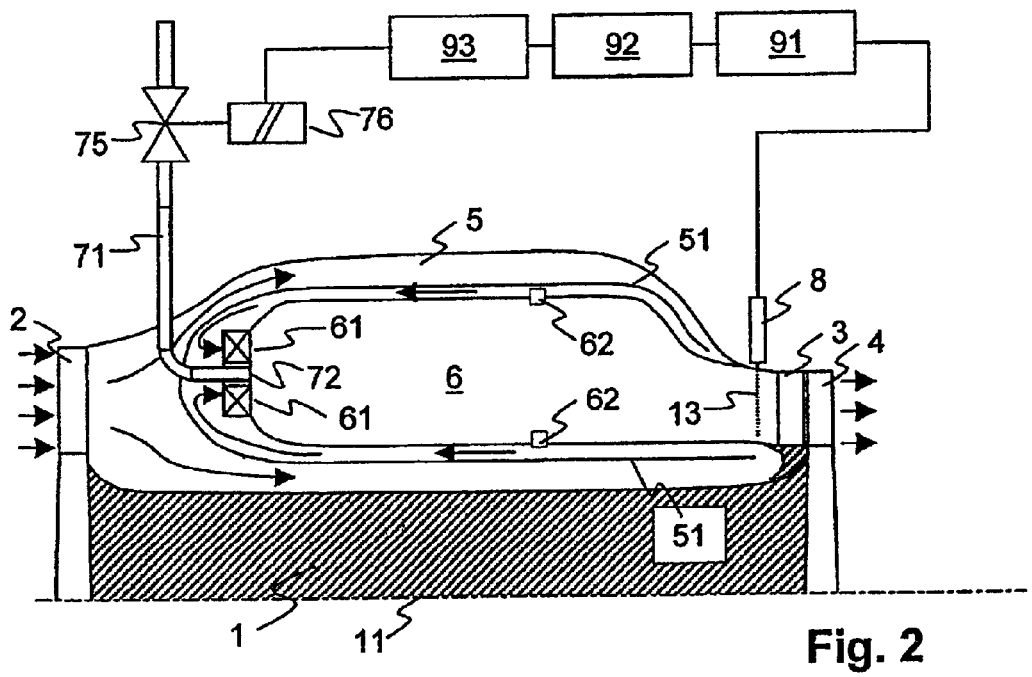
FIG. 2 shows the longitudinal section from FIG. 1 with an alternative control engineering device.

FIG. 2 diagrammatically depicts a further embodiment of the gas turbine according to the invention, with a corresponding variant of the controller 9. The signal is filtered in a signal filter 91, in order to determine a preferred frequency, which is usually <2 kHz. Then, the filtered signal is phase-shifted by a suitable amount by a phase-shift means 92 and is amplified by a signal amplifier 93. The control signal obtained in this way is passed to the quick-reacting, electromagnetic actuator or second actuating element 76, which modulates the flow of fuel by moving the modulation valve 75. A similar method has been disclosed in C. 0. Paschereit, E. Gutmark and W. Weisenstein "Flow-acoustic interactions as a driving mechanism for thermoacoustic instabilities" 4th AIAA/CEAS Aeroacoustics Conference, Toulouse, France, Jun. 2–4 1998, AIAA Paper 98–2272. The configuration shown in FIG. 2 is an alternative to the original configuration with the controller 9, the actuator 74 and the valve 73. If it is used, the modulation valve 75, in order to modulate the flow of fuel, additionally has to control the total flow of fuel to the burner in question.

In another embodiment of the invention, the means 7 for introducing fuel has, instead of a valve 73, in each case a main valve and a modulation valve connected in parallel therewith, which supply the mass flow of fuel to the burner. In this case, the main valve is set to a mass flow rate which is lower than a predetermined nominal mass flow rate of the burner. The modulation valve is used to add an additional mass flow rate which is periodically modulated at an excitation frequency of 0.1 to 1000 Hz, so that the total mass flow rate to the burner periodically fluctuates around a mean which is equal to the nominal mass flow rate. The excitation frequency is in this case determined by the controller 9 on the basis of the measured combustion fluctuations. The nominal mass flow rate is predetermined by a superimposed control unit of the gas turbine which, for example, controls and monitors the power, rotational speed and/or temperatures of the gas turbine.

In a further preferred embodiment of the invention, a plurality of means 7 for introducing fuel are controlled on the basis of temperature values from a plurality of temperature sensor 8, in order to compensate for azimuthal combustion fluctuations by means of joint control.

List of designations

1 Rotor
11 Axis of symmetry
12 Circumferential segment
13 Direction of view
14 Aperture angle
2 Row of compressor blades
3 First row of guide vanes
31 First gas-temperature profile
32 Second gas-temperature profile
33 Third gas-temperature profile
34 Fourth gas-temperature profile
4 First row of rotor blades
5 Plenum
51 Guide plates
6 Combustion chamber
61 Combustion-air feed
62 Cooling-air feed
7 Means for introducing fuel
71 Fuel feed line
72 Fuel lance
73 Valve
74 First actuating element
75 Modulation valve 76 Second actuating element
8 Temperature sensor
9 Controller
91 Signal filter
92 Phase shift
93 Signal amplifier
I Section plane
r Radial direction
r1 Radial direction
r2 Second radius
t Gas-temperature axis

What is claimed is:

1. A gas turbine, comprising:
a combustion chamber;
a first row of guide vanes arranged on the outflow side of the combustion chamber;
a plurality of temperature sensors are distributed uniformly over a circumference of the gas turbine, the temperature sensors for measuring temperature values, each of said temperature sensors having an associated controller and means for introducing fuel into the combustion chamber, which means can be controlled on the basis of the temperature values, wherein the temperature sensors are spectrometers, are designed to measure a combustion-gas temperature and are arranged so as to measure a gas temperature which prevails immediately in front of the first row of guide vanes, wherein the means for introducing fuel are controlled on the basis of temperature values from the temperature sensors, in order to compensate for azimuthal fluctuations in combustion.

2. The gas turbine as claimed in claim 1, wherein the temperature sensors are designed to measure a gas temperature of steam, carbon dioxide, nitrogen, oxygen or some other combustion-gas component.

3. The gas turbine as claimed in claim 2, wherein the temperature sensors have bandpass filters, which transmit radiation corresponding to the combustion-gas component under consideration.

4. The gas turbine as claimed in claim 1, wherein the temperature sensors measure a combustion-gas temperature at a distance of 0.1 to 5 cm in front of the first row of guide vanes.

5. A method for suppressing azimuthal fluctuation modes in a gas turbine, in which a plurality of temperature sensors are used to measure temperature values, and means for introducing fuel into a combustion chamber are controlled on the basis of these temperature values for suppressing said fluctuation modes, wherein the temperature sensors are spectrometers which are designed to measure a combustion-gas temperature and are used to measure combustion-gas temperatures which prevail immediately in front of a first row of guide vanes, and wherein temperature values from a plurality of temperature sensors are used to determine an associated gas-temperature profile in the azimuthal direction in front of the first row of guide vanes.

6. A method for suppressing azimuthal fluctuation modes in a gas turbine, in which a plurality of temperature sensors are used to measure temperature values, and means for introducing fuel into a combustion chamber are controlled on the basis of these temperature values for suppressing said fluctuation modes, wherein the temperature sensors are spectrometers which are designed to measure a combustion-gas temperature and are used to measure combustion-gas temperatures which prevail immediately in front of a first row of guide vanes, wherein a desired quantity of fuel is reduced according to a deviation of a temperature value of a temperature sensor from an associated reference value for all the means for introducing fuel.

7. A method for suppressing azimuthal fluctuation modes in a gas turbine, in which a plurality of temperature sensors are used to measure temperature values, and means for introducing fuel into a combustion chamber are controlled on the basis of these temperature values, wherein the temperature sensors are spectrometers which are designed to measure a combustion-gas temperature and are used to measure combustion-gas temperatures which prevail immediately in front of a first row of guide vanes, wherein the means for introducing fuel are controlled on the basis of temperature values from a plurality of temperature sensors, in order to compensate for azimuthal fluctuations in combustion.

* * * * *